US005630525A

United States Patent [19]

Christoffersen et al.

[11] Patent Number: 5,630,525

[45] Date of Patent: May 20, 1997

[54] DISPENSER FOR CONSECUTIVE DISPENSING OF TABLETS

[75] Inventors: Peter Bender Christoffersen, Lyngby; Ib Hansen, Herlev, both of Denmark

[73] Assignee: Novo Nordisk A/S, Bagsvaerd, Denmark

[21] Appl. No.: 464,751

[22] PCT Filed: Dec. 17, 1993

[86] PCT No.: PCT/DK93/00424

§ 371 Date: Jun. 15, 1995

§ 102(e) Date: Jun. 15, 1995

[87] PCT Pub. No.: WO94/14681

PCT Pub. Date: Jul. 7, 1994

[30] Foreign Application Priority Data

Dec. 18, 1992 [DK] Denmark .................................. 1516/92

[51] Int. Cl.[6] .................................................... B65G 59/00

[52] U.S. Cl. ................................ 221/5; 221/89; 221/122; 221/151

[58] Field of Search .................................... 206/533, 534, 206/536; 221/5, 89, 91, 113, 119, 121, 122, 151, 152, 288, 86

[56] References Cited

U.S. PATENT DOCUMENTS

| | | | |
|---|---|---|---|
| 3,095,085 | 6/1963 | Meijer | 221/122 |
| 3,527,383 | 9/1970 | Borsum et al. | 221/122 |
| 3,604,559 | 9/1971 | McCall et al. | 206/42 |
| 4,228,920 | 10/1980 | Burton | 221/265 |
| 4,667,845 | 5/1987 | Frazier et al. | 221/5 |
| 4,807,757 | 2/1989 | Rappaport | 206/535 |
| 5,127,543 | 7/1992 | Meisels | 221/151 |
| 5,152,422 | 10/1992 | Springer | 221/121 |

FOREIGN PATENT DOCUMENTS

0485819A1 11/1991 European Pat. Off. .

*Primary Examiner*—H. Grant Skaggs
*Attorney, Agent, or Firm*—Steve T. Zelson, Esq.; James Harrington, Esq.

[57] ABSTRACT

A dispenser for consecutive dispensing of tablets in a fixed order comprising a cylindrical body defining along its periphery a number of juxtaposed vertical chutes each accommodating a number of tablets piled on edge radially oriented in the body, a cup shaped dispensing part comprising a bottom plate having an upstanding cylindric wall and forming a stop at the lower end of the chutes. An opening in the cylindric wall allows a tablet on edge to pass from the outside of the cup into the inner space thereof. Above the opening a protrusion extends radially outwards from the cylindric wall into the space between a tablet abreast of the opening and a possible overlying tablet in the chute, and a wall adjacent to the opening extends into the lower ends of the chutes. A detent mechanism makes the body and dispensing part stepwise unidirectionally rotatable in relation to each other. The number of steps corresponding to the number of chutes, and the direction of rotation being so that the chutes are moved from a position abreast of the opening towards the radially extended wall.

12 Claims, 5 Drawing Sheets

DISPENSER FOR CONSECUTIVE DISPENSING OF TABLETS

CROSS-REFERENCE TO RELATED APPLICATIONS

Figure 1:
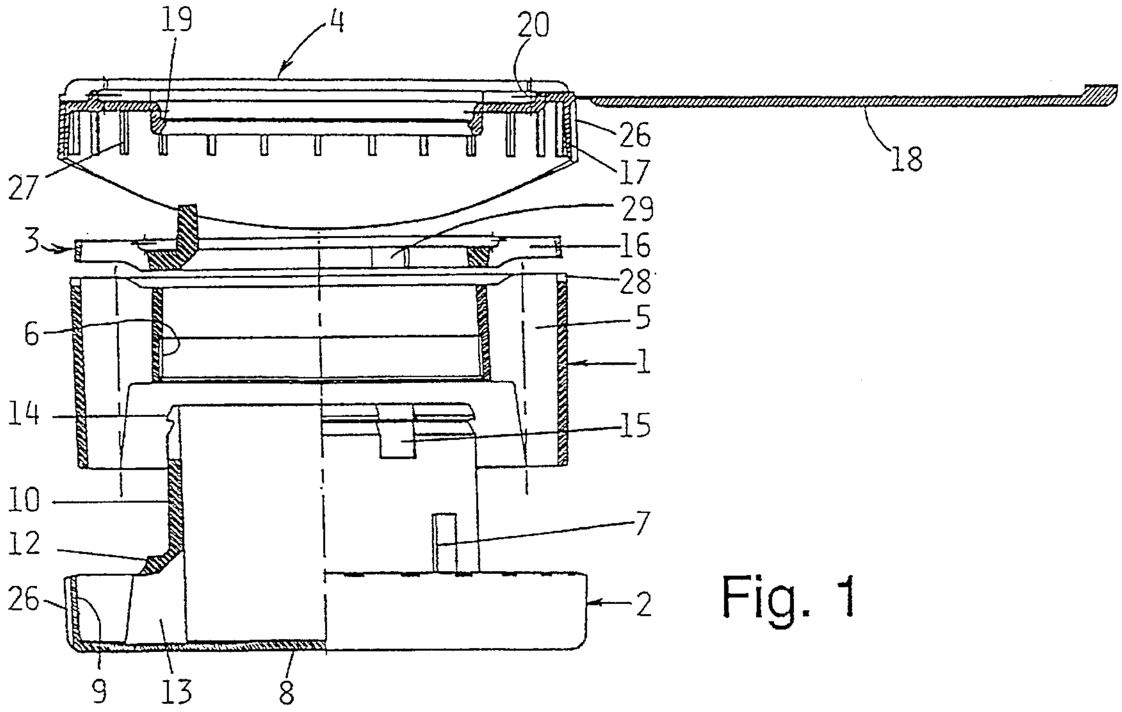

This application is filed as the national stage of PCT/DK93/00424 filed Dec. 17, 1993, which is incorporated herein by reference.

The invention relates to dispensers for consecutive dispensing of tablets in a fixed order.

For certain medical treatments tablets with varying medicine content must be taken in a fixed order. E.g. some tablets with one medicine content may be taken one a day for some days and thereafter tablets with another medicine content through the following days and so on.

For the dispensing of anticonception tablets dispensers are known for a consecutive one a day dispensing of 21 to 28 tablets. Such dispensers are shaped as flat round boxes with a lid having an opening which may be stepwise clicked along the periphery of the box to consecutively dispense tablets stored lying on their mainly flat side in chambers arranged along the periphery of the box.

A wish has occurred for dispensers containing tablets for a longer treatment period. However, an arrangement of more chambers along the periphery of the box would make it necessary to let the box have a larger diameter, which would make the box less easy to carry in a pocket. A doubling of the box diameter would make the box accommodate a double number of tablets, but would quadruple the unused dead space in the middle of the box.

U.S. Pat. No. 3,604,559 discloses a dispenser wherein the tablets are stacked in three layers along the periphery of a box of the kind having a dispensing opening in its lid. The tablets are herein piled with their flat sides against each other, the three layers being displaced half a tablet diameter in relation to each other. In each layer the tablets are accommodated in circular openings provided along the periphery of an individually rotatable disc. The tablets in the layers are lying on their flat side along the periphery of the dispenser. A better utilization of the space may be obtained by putting the tablet on their edge and let them be oriented radially in the dispenser.

It is the object of the invention to provide a simple and compact dispenser for consecutive dispensing of tablets in a fixed order.

This is obtained by a dispenser comprising a cylindric body defining along its periphery a number of juxtaposed vertical chutes each accommodating a number of tablets piled on edge radially oriented in the body, a cup shaped dispensing part comprising a bottom plate and an upstanding cylindric wall on this plate, the plate forming a stop at the lower end of the chutes, and the cylindric wall having at its lower end adjacent to the bottom plate a slot forming an opening allowing a tablet on edge to pass from the outside of the cup into the inner space thereof, a protrusion above the slot extending radially outwards from the cylindric wall into the space between a tablet abreast of the slot and a possible overlying tablet in the chute, and a radially outwards extending wall adjacent to the slot and extending into the lower ends of the chutes, and a detent mechanism making the body and the bottom part stepwise unidirectionally rotatable in relation to each other, the number of steps corresponding to the number of chutes, and the direction of rotation being so that the chutes are moved from a position abreast of the slot towards the radially extending wall.

The cylindric wall of the dispensing part may at its upper end carry a stop ring which is along its periphery provided with walls which in each of the step positions of the dispensing part form continuations of the chutes, the stop ring being secured to the dispensing part to rotate with this part in relation to the body. This construction serves a locking of the unidirectional stepwise movement of the dispensing part in relation to the body when the device is turned upside down, as the upper tablets in the chutes will then roll to a position where these tablets are abutting partly the walls of the chutes and partly the walls of the stop ring.

The chutes may be tapering being widest at their top. Thereby it may be ensured that at least one of the tablets will roll into its locking position in engagement with the stop ring as soon as the dispenser is tilted about 90° from its vertical position.

An annular lid part may close the chutes at their upper end and may be secured to either the body part or the dispensing part to follow this part in its rotation relatively to the other part.

The lid part may carry a day ring concentric with this lid part and which by the use of a tool may be rotated relatively to the lid part to set the day for beginning the use of the tablets by making a pointer point at this day.

The pointer may be secured to the dispensing part to be rotated with this part relatively to the body.

The lid part may carry a hinged lid which may be closed to cover the day ring and the opening of a cup formed by the cylindric wall and the bottom plate of the dispensing part.

Figure 2:
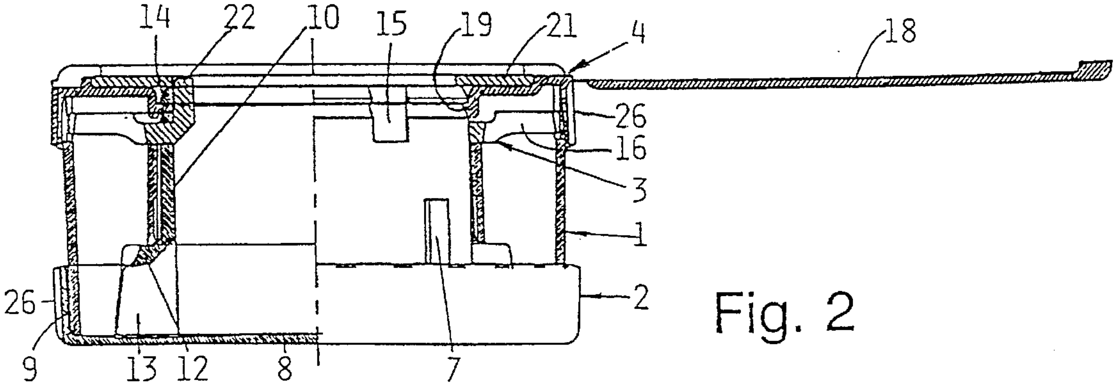
Figure 3:
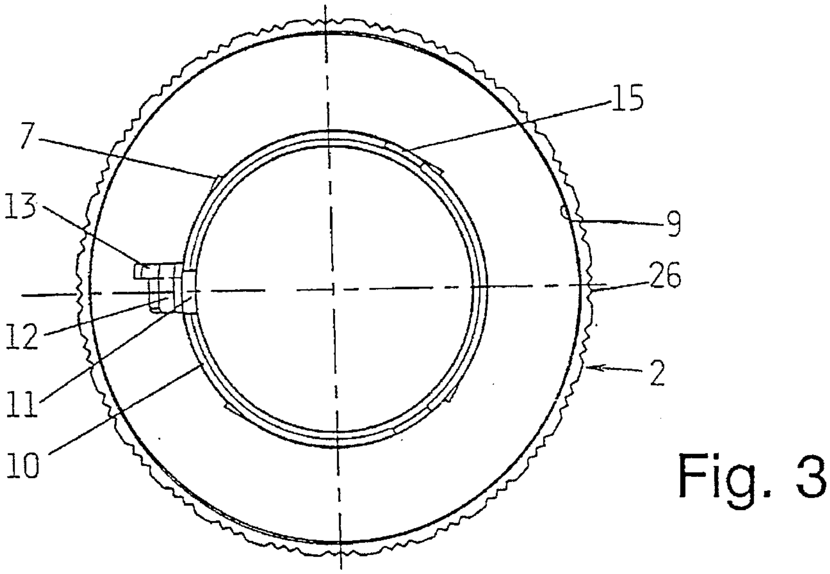
Figure 4:
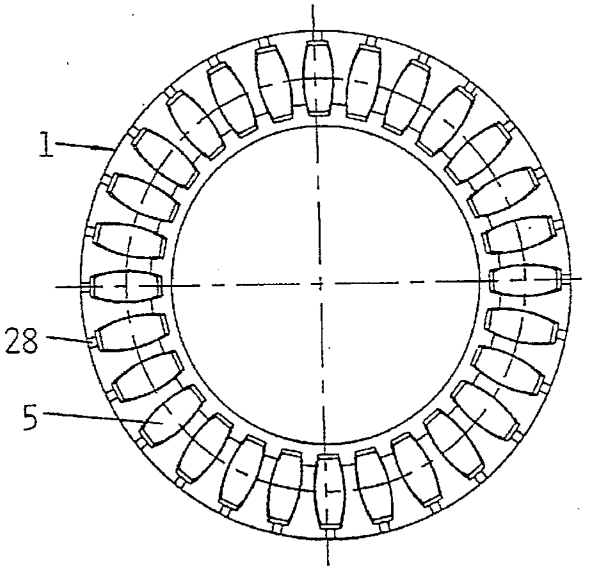
Figure 5:
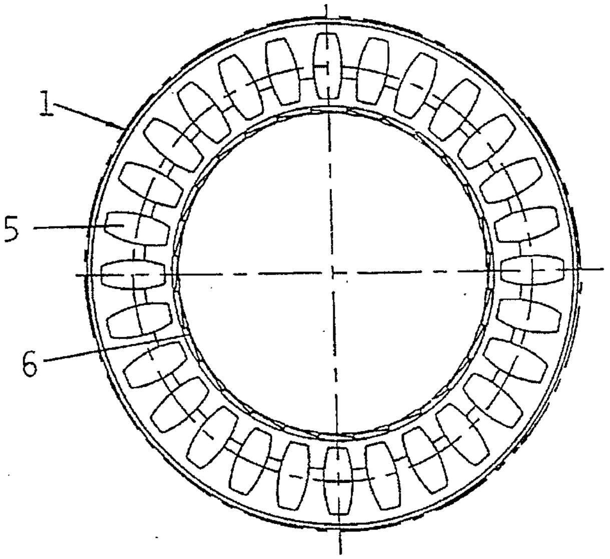
Figure 6:
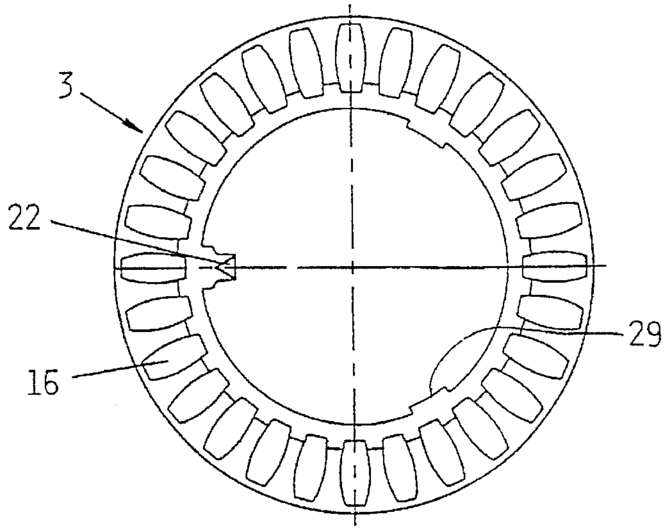
Figure 7:
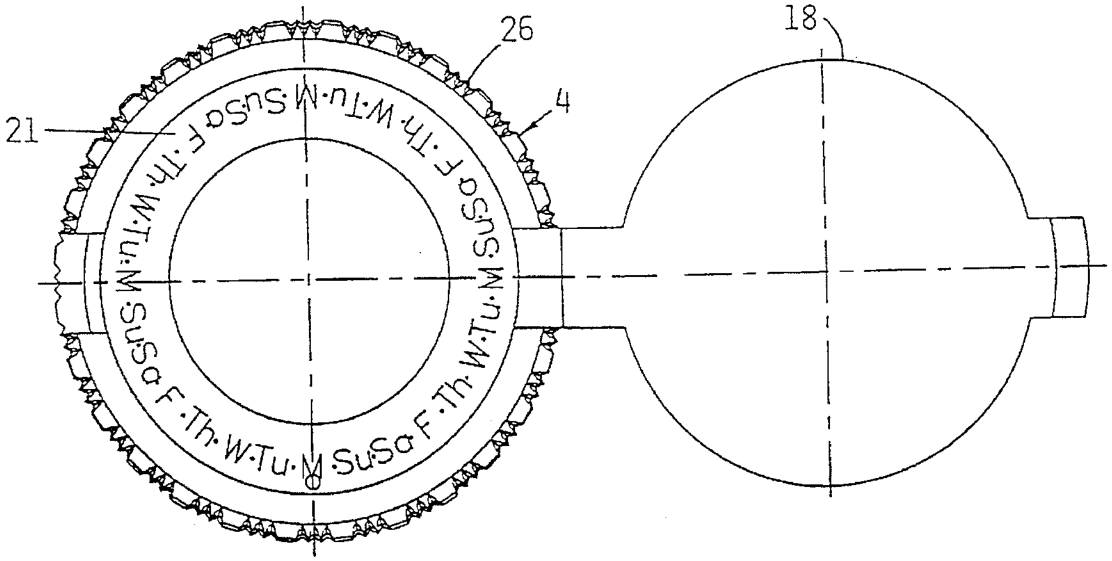
Figure 8:
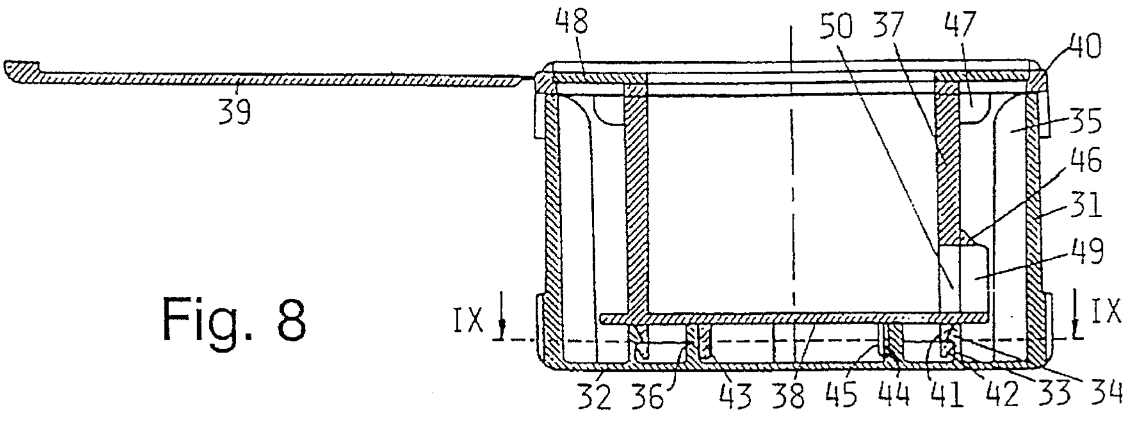
Figure 9:
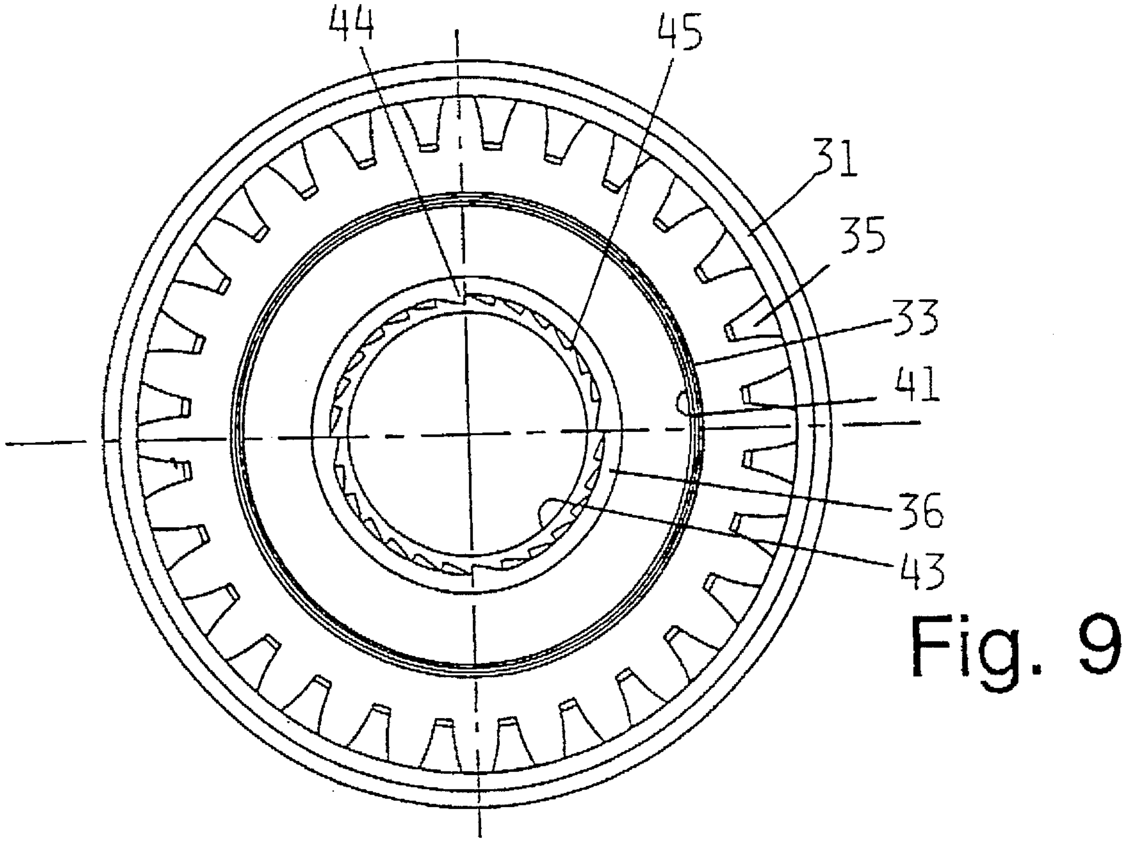

In the following the invention will be described in further details with reference to the drawings, wherein FIG. 1 shows an embodiment of a dispenser according to the invention with the components of the dispenser pulled apart, FIG. 2 shows the dispenser of FIG. 1 with the components assembled, FIG. 3 shows the dispensing part of the dispenser in FIG. 1 seen from above, FIG. 4 shows the body part of the dispenser in FIG. 1 seen from above, FIG. 5 shows the body of the dispenser in FIG. 1 seen from below, FIG. 6 shows the stop ring of the dispenser in FIG. 1 seen from above, FIG. 7 shows the lid part of the dispenser in FIG. 1 seen from above with the lid open, FIG. 8 shows a sectional view of another embodiment of a dispenser according to the invention, FIG. 9 shows a sectional view along the line IX—IX in FIG. 8.

Figure 10:
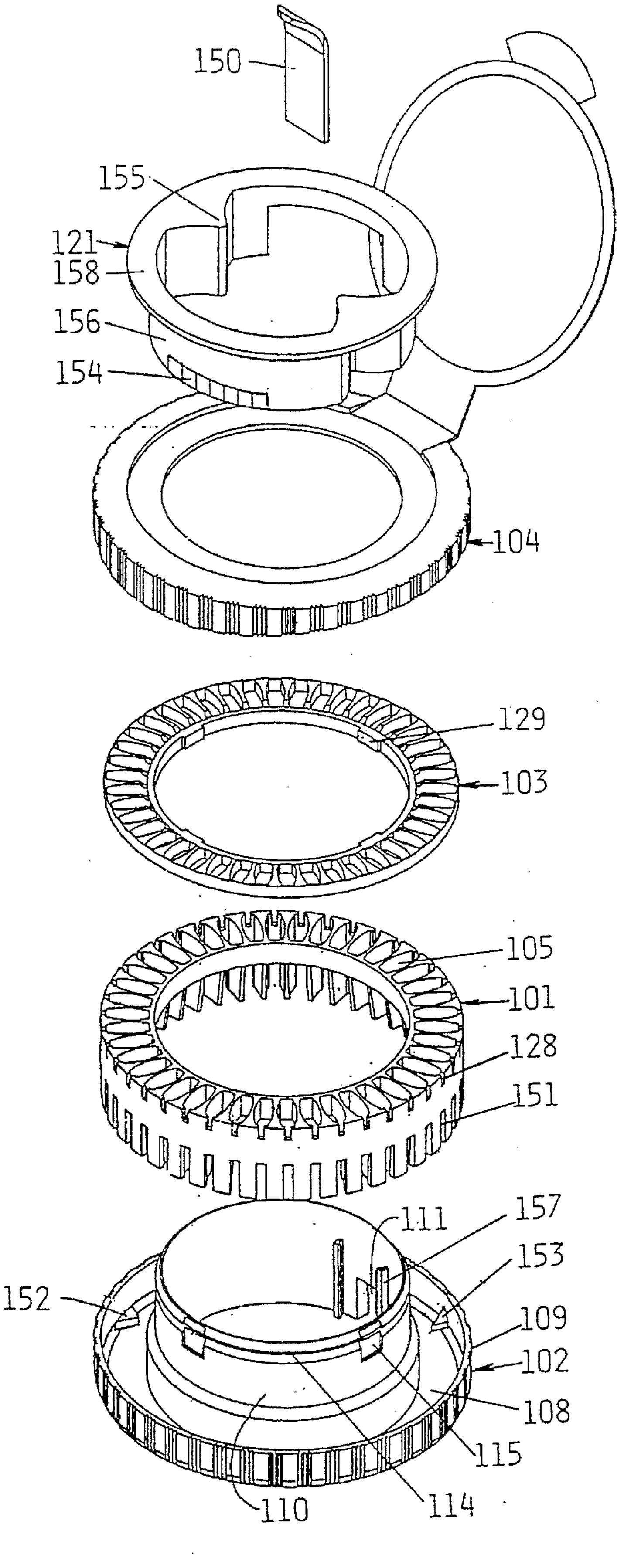

FIG. 10 shows an exploded view of another embodiment of a dispenser according to the invention.

In FIG. 1, an exploded picture of an embodiment of the dispenser according to the invention reveals sectional or partly sectional views of the constituents of this dispenser. The reference number 1 designates a cylindric body which is shown seen from above and from below in FIG. 4 and 5, respectively, 2 designates a dispensing part which is shown seen from above in FIG. 3, 3 is a stop ring which is seen from above in FIG. 6, and 4 designates a lid part which is shown seen from above with its lid open in FIG. 7.

The cylindric body 1 has along its periphery a number of juxtaposed vertical chutes 5 which may each accommodate a number of the tablets to be dispensed piled on edge radially oriented in the body 1. If different tablets have to be dispensed in a certain sequence and this sequence has to be repeated, the number of chutes may be chosen equal to the number of dispensings in the sequence which offers the advantage that the tablets in a chute are all the same kind. This will make the filling of the dispenser more simple.

The cylindric body 1 is provided with a central bore which at its upper end leaves the chutes 5 with a wall between the chutes and the bore but which has at its lower end an enlarged diameter, so that the radially inner wall of the chutes and part of adjacent side walls of the chutes are removed to a height corresponding to about 1.5 times the diameter of a tablet.

In the part of the bore with the smaller diameter there is provided a circumferential saw toothing 6 which cooperates with one or more pawls 7 on the dispensing part 2 to make the parts 1 and 2 unidirectionally stepwise rotatable relatively to each other. The number of teeth or steps corresponds to the number of dispensings in a sequence or a multiple thereof.

The dispensing part 2 comprises a circular bottom plate 8 having at its periphery a circumferential upwards extending vertical wall 9 fitting over the outer periphery of the body 1. Concentric with this circumferential vertical wall there is provided another vertical cylindric wall 10 on the bottom plate 8. This cylindric wall has an outer diameter corresponding to the smaller diameter of the bore in the body part 1 allowing this cylindric wall to be inserted rotatably in this bore. When so inserted the pawls 7 will be in engagement with the internal toothing 6 in the bore.

Through the vertical cylindric wall 10 there is provided an opening 11 of a size allowing a tablet standing on its edge to pass. Above the opening 11 there is provided a radial outwardly protruding protrusion 12 with a height above the bottom plate 8 allowing a tablet standing on its edge to pass under the protrusion from the outer side of the vertical wall 10 to the inner side thereof, the protrusion fitting into the space between a lower tablet standing on its edge supported by the bottom plate 8 and another tablet piled on its edge on this lower tablet.

Adjacent to the opening 11 and the protrusion 12 the vertical wall 10 is provided with a partition 13 extending radially outwards from the vertical cylindric wall 10. The function of this partition 13 shall be returned to below.

The height of the vertical wall 10 is so that this wall, when inserted in the bore of the body part 1 with the circumferential wall 9 of its bottom plate 8 fitting over the outer diameter of the body and the bottom plate 8 closing the lower ends of the chutes 5, will protrude with its upper end over the top of the body 1. The upper protruding part is provided with a first annular snap lock hook 14 and with a number of recesses 15.

The stop ring 3 is an annular element having a central bore fitting over the part of the vertical wall 10 extending over the cylindric body when the wall 10 is inserted in this body. The central bore of the stop ring 3 is provided with protrusions 29 extending inwardly in this bore and corresponding to the recesses 15 in the upper part of the cylindric wall 10 to engage these recesses so that the stop ring 3 may be carried irrotatably on this wall 10.

Along its periphery the stop ring 3 has a number of axial openings 16 corresponding to the number of chutes in the body 1, which openings in all the defined relative step positions of the body 1 and the dispensing part 2 form continuations of the chutes 5 when the stop ring is mounted at the upper end of the vertical wall 10. The continuations have a length smaller than the diameter of a tablet. Further, the stop ring is provided with a pointer 22 at the inner side of its bore, which pointer is placed above the opening 11 and due to the unrotatable coupling between the stop ring and the vertical wall 10 will remain placed above the opening 11 when the dispensing part is rotated relatively to the body 1.

The outer diameter of the stop ring 3 is smaller than the outer diameter of the body 1 allowing a short cylindric circumferential wall 17 on the lid part 4 to grip over the outer wall of the body 1 leaving the stop ring rotatable relatively to this body and the lid part 4, which parts are firmly coupled to each other to be rotated as a common unit relatively to a unit formed by the dispensing part 2 and the stop ring 3.

The lid part is provided with a bore which has along its periphery a downwards extending circumferential second snap lock hook 19 which may be brought into engagement with the first snap lock hook 14 at the upper end of the vertical cylindric wall 10 of the dispensing part 2 to lock the lid part 4 to this dispensing part 2 in a way allowing rotational movement of these two parts relatively to each other. The lid part is further provided with a lid 18 hinged to the lid part 4 in such a way that it may be swung from a position where it covers the bore in the lid part and thereby closes the internal cylindric space inside the vertical wall 10 to a position where it admits access to this space.

In a ring shaped guide 20 on the upper side of the lid part 4 there is mounted a day-ring 21 carrying an ordered sequential indication of the days in a week. This day ring is mounted concentrically with the lid part bore in such a way that it may be reluctantly rotated relatively to the lid part 4 possibly by the use of a tool.

The outer surfaces of the circumferential walls 9 and 17 of the dispensing part 2 and the lid part 4, respectively, are provided with axial ribs 26 to provide a good finger grip, so that one part may be grasped by one hand, and the other part may be grasped by the other hand to rotate the two units comprising the respective parts relatively to each other. This rotation is made unidirectional by the pawls 7 in the dispensing part unit engaging the toothing 6 in the body part unit. Further, the enlarged diameter of the lower part of the bore in the body permits this relative rotation by leaving space for the protrusion 12 and the partition 13 on the account of some of the lower parts of the chutes 5.

Before the tablets are filled into the dispenser, the cylindric body 1 is passed with its bore over the vertical wall 10 of the dispensing part 2, and the stop ring is mounted on the upper part of the vertical wall 10 protruding from the upper part of the cylindric body 1, the recesses 15 being so designed that the stop ring may be placed only in one rotational position in relation to the bottom part 2, namely the position where the pointer 22 is placed directly above the opening 11, which is closed by a not shown closing device which is accessible through the inner space of the vertical wall 10 to be removed when the dispensing shall begin.

The chutes may now be filled with the tablets which have to be sequentially dispensed beginning with the chute indicated by the pointer 22. Another possibility is to fill into the chutes first the bottom layer of tablets and thereafter the overlaying layer and so on using a filling machine having a number of filling spouts corresponding to the number of chutes.

When the tablets have been filled into the chutes, the lid part 4 is placed with its circumferential wall 17 gripping over the outer cylindric wall of the body 1, and the circumferential wall 17 is made unrotatable in relation to this cylindric wall of the body 1, so that the body 1 and the lid part 4 are unrotatable in relation to each other. This is obtained by the depending wall 17 having at its inner side axial ribs 27 engaging axial grooves 28 at the upper end of the body 1. The dispenser will now appear as a tablet box which may be closed by the lid 18.

When you start using the dispenser the box is opened and the day ring is rotated until the pointer 22 points at the proper day. The closing device is then removed, and the first tablet will roll out through the opening 11 into the inner space of the box wherefrom it may be poured out to be consumed. The protrusion 12 immediately above the opening 11 will prevent the overlying tablet in the chute from falling down to the position where it could roll out through the opening 11. Next time the body with the chutes is moved a step forwards, the overlying tablet is moved to the opposite side of the partition, and here no protrusion is present to prevent it from falling to the bottom of the chute.

The next tablet is dispensed when the body part 1 with its chutes 5 is rotated in relation to the dispensing part to bring the next tablet abreast of the opening 11. The body 1 can be rotated one step in the defined direction until the next tablet abuts the partition 13. This tablet will now be abreast of the opening 11 to be dispensed via the inner space of the box.

As appears, the box is intended to be used in a position with its length axis about vertical and with the lid part up. If the device is tilted so that the tablets are not supported by the bottom plate, it cannot be made sure that the relative rotation is stopped by the next tablet abutting the partition 13. Therefore, the chutes are made tapering towards the bottom, so that the tablets will roll or slide to the opposite end of the chutes when the device is tilted so far that the tablets are no longer supported by the bottom plate 8. When rolling to the opposite end of the chutes, the tablets will come to a position where they are accommodated partly in the continuations of the chutes in the stop ring 3 and partly in the upper end of the chutes 5. Thereby the relative rotation of the stop ring 3 and the body 1 and consequently the relative rotation of the body 1 and the dispensing part 2 are prevented.

In FIGS. 8 and 9 showing another embodiment of a dispenser according to the invention, a cylindric body 31 comprises a cylindric wall being on its inner surface provided with axial ribs 35 defining a number of juxtaposed chutes along the periphery of the body 31. At its lower end the body 31 is provided with a bottom 32 having on its side facing the inner space of the body a circular rib 33 concentric with the body 31 and carrying a snap lock hook 34. Another circular rib 36 concentric with the first one but having a smaller diameter is provided on the same side of the bottom 32. A combination part combining the functions of the dispensing part 2, the stop ring 3, and the lid part 4 in FIG. 1 has a cup shaped part comprising a cylindric wall 37 being at its lower end closed by a bottom plate 38 and being at its upper end provided with an annular part 40 carrying a depending cylindric skirt and a lid 39 hinged to this annular part 40. On the outer side of the bottom plate 38 there is provided a circular rib 41 concentric with the cylindric wall 37 and carrying a circular snap lock hook 42, the rib having a diameter allowing this snap lock hook 42 to engage the snap lock hook 34 on the bottom 32 of the cylindric body when the cylindric wall 37 is inserted into the body 31. This engagement secures the body and the combination part to each other in a way making them relatively rotatable but axially locked.

The outer side of the bottom plate 38 is further provided with another circular rib 43 concentric with the rib 41 but having a smaller diameter allowing it to fit into the circular rib 36 on the bottom 32 of the body 31. The Cylindric surfaces of the ribs 36 and 43 facing each other are provided with saw tooth shaped protrusions 44 and a circular saw toothing 45, respectively, to provide a detent mechanism defining a number of possible discrete rotational positions of the body 31 and the combination part relatively to each other. This number should correspond to the number of chutes.

It shall be noticed that it is of no importance to the invention which of the ribs 36 or 43 has the smaller diameter and which of the ribs is carrying the single sawtooth protrusions and the saw toothing.

At the lower end of the cylindric wall 37 there is provided an opening 50 leading from the inner space of the cylindric wall to the outer side thereof. This opening is dimensioned to allow a tablet standing on its edge to pass in a direction perpendicular to the axis of the tablet. The bottom plate 38 extends outside the cylindric wall to protrude into the chutes defined by the ribs 35. Adjacent to the opening in the cylindric wall 37 a radial outgoing partition 49 is provided, and above the opening a protrusion 46 is provided on the outer side of the cylindric wall 37. This protrusion 46 shall hold back an overlying tablet when a tablet is dispensed to the inner space of the cylindric wall 37 through the opening 50.

Protruding short axial ribs 47 are provided at the upper end of the cylindric wall 37. These ribs 47 collaborate with the ribs 35 of the body 31 to define the upper end of the chutes. When a tablet is positioned in this upper end of one of the chutes, the relative rotational movement of the body and the combination part is blocked. This ensures that the dispenser is held so that it is mainly vertical with its bottom down when it is operated.

The annular lid carrying part 40 is an integral part of the combination part and is provided by a ring shaped guide accommodating a day ring 48 rotatably in the annual part. This day ring may serve to close the chutes when pills have been filled into the dispenser through the top of the chutes. The day ring is transparent and carries the names of the days of the week in sequence. Before the dispenser is put into service, the day ring is rotated in the guide to bring a mark on the underlying body 31 abreast of the day in question. Alternatively, the names of the days may be printed at the edge of the body, one day at each chute, and a mark on the day ring may be set abreast of the day in question.

Knurls along the periphery of the lower end of the body and on the outer side of the depending skirt provide good finger grips so that each part may be gripped to rotate the two parts relatively to each other to bring a tablet abreast of the opening 50 for dispensing into the cup formed by the combination part.

FIG. 10 shows an exploded view of another embodiment corresponding to the embodiment shown in FIG. 1 and 2, but whereas the embodiment in FIG. 1 and 2 shows a dispenser wherein the tablets are stored in three layers each layer containing 24 tablets, the embodiment in FIG. 10 has the tablets stored in two layers each layer containing 42 tablets. Hereby a more flat design of the dispenser is obtained. The parts of the dispenser of FIG. 10 are to some extent similar to the parts of the dispenser shown in FIG. 1 and 2, only a few changes are made. Corresponding parts in FIG. 10 and in FIG. 1 and 2 are provided with the same reference numerals, only the numerals of FIG. 10 has a preceding digit "1".

The dispenser in FIG. 10 comprises a cylindric body 101 having 42 chutes 105, a dispensing part 102, a stop ring 103, a lid part 104, a day ring 121, and a closing strip 150.

The dispenser is assembled by passing a cylindric wall 110 of the dispensing part 102 into the central opening of the cylindric body 101. On the upper part of the cylindric wall 110 protruding through the dispensing part the stop ring 103 is positioned with protrusions 129 which extend inwardly in its bore engaging corresponding recesses 115 at the upper end of the cylindric wall 110. Thereafter the lid part 104 is snap-locked to the cylindric wall 110 by a snap lock hook 114 at the upper end of this cylindric wall 110 snapping over the edge of a bore in the lid part. The lid part 104 is provided with not seen ribs corresponding to the ribs 27 in FIG. 1, which ribs engage recesses 128 at the upper edge of the cylindric body 101. In this way the dispensing part 102 and the stop ring 103 constitute one part which may be rotated relative to another part constituted by the cylindric body 101 and the lid part 104.

In the embodiment of FIG. 10 the relative rotation of the two parts are divided into steps defined by the cylindric body 101 being provided with recesses 151 at its lover end, one recess for each chute 105, and protrusions 152 and 153 being provided at the inner side of a circumferential vertical wall 109 at the outer edge of a bottom plate 108 of the dispensing part 102, the protrusions 152 and 153 engaging the recesses 151 of the cylindric body 101. The protrusions are made as two sorts of teeth, one sort 152 having two ramp shaped flanks ensuring that the tooth rests centrally in the recess 151 for safely positioning of the two parts in relation to each other, and another sort 153 having one steep flank and one ramp shaped flank ensuring that the relative rotation of the two parts is unidirectional. Preferably more than one tooth of each sort are provided.

The day ring 121 has a depending skirt 156 by which it fits into the inner opening of the cylindric wall 110 on which wall is provided at not shown tooth engaging one of seven adjacent recesses 154 in the outer cylindric surface of the skirt whereby the day ring 121 may be positioned in one of seven start positions corresponding to each of the days in the week. On a flange 158 of the day ring 121 the days of the week are sequentially printed each day occupying 1/42 of the perimeter of the flange, and a pointer mark on the lid part 104 points at one of the days of the week. Alternatively the days of the week may be printed on the lid part 104 and the pointer mark may be established on the day ring. The day ring has inward protrusions 155 forming a finger grip by which the day ring may be rotated in the opening in the cylindric wall 110 to bring the appropriate day of the week in line with the pointer mark when the treatment is started.

In the same way as described by FIG. 1 and 2 the dispensing of tablets is obtained through an opening 111 in the cylindric wall 110 when the two relative rotatable parts of the dispenser is moved stepwise in the allowed direction. Until the first tablet shall be dispensed, the opening 111 is closed by a closing strip 150 which guided in a pair of guideways 157 covers the opening 111. When a treatment is started the day ring 121 is rotated to bring the actual day of the week in alignment with the pointer mark and the closing strip 150 is drawn out of the guideways 157. Now the first tablet lying abreast of the opening 111 will be dispensed in the cup constituted by the dispensing part 102.

A part of the skirt 156 is cut away to leave the opening 111 and the guideways 157 free in all the seven possible start positions of the day ring 121. New tablets are brought in line with the opening 111 by successive rotation of the two parts in relation to each other, and a partition and a protrusion corresponding to the partition 13 and the protrusion 12 in FIG. 1 and 2 are provided to control the dispensing so that a tablet lying over the tablet abreast of the opening 111 is not dispensed immediately after the tablet abreast of the opening. In the exploded view this partition and protrusion are hidden behind the cylindric wall 110.

We claim:

1. A dispenser for consecutive dispensing tablets in a fixed order, the dispenser comprising:

(a) a cylindrical body comprising one or more peripheral juxtaposed vertical chutes each accommodating one or more tablets piled on edge radially orientated in the cylindrical body;

(b) a cup shaped dispensing part comprising a bottom plate and an upstanding cylindrical wall on the bottom plate, the plate forming a stop at the lower end of the chutes, and the cylindrical wall comprising at its upper end a stop ring comprising one or more peripheral walls which in step positions of the dispensing part form continuations of the chutes, the stop ring being secured to the dispensing part to rotate with the dispensing part in relation to the cylindrical body; the cylindrical wall comprising at its lower end adjacent to the bottom plate a slot forming an opening allowing a tablet on edge to pass from the outside of the cup into the inner space thereof, a protrusion above the slot extending radially outwards from the cylindrical wall into the space between a tablet abreast of the slot and a possible overlying tablet in the chute, and a radially outward extending wall adjacent to the slot and extending into the lower ends of the chutes, and (c) a detent mechanism making the body and the dispensing part stepwise unidirectionally rotatable in relation to each other, the number of steps corresponding to the number of chutes, and the direction of rotation being so that the chutes are moved from a position abreast of the slot towards the radially extending wall.

2. The dispenser according to claim 1, the dispenser comprising an annular lid part which upwardly closes the upper end of the chutes and is secured to the body part to follow this part in its rotation relatively to the other part.

3. The dispenser according to claim 2, the dispenser comprising an annular lid part which upwardly closes the upper end of the chutes and is secured to the dispensing part to follow this part in its rotation relatively to the other part.

4. The dispenser according to claim 3 wherein the lid part carries a day ring concentric with the lid part and which is rotated relatively to the lid part.

5. The dispenser according to claim 4, wherein a pointer pointing at the day ring is secured to the dispensing part to be rotated with it relatively to the body.

6. The dispenser according to claim 4 wherein the lid part carries a hinged lid which may be closed to cover the day ring and the opening of a cup formed by the cylindric wall and the bottom plate of the dispensing part.

7. The dispenser according to claim 3 wherein the chutes are conical being widest at the top.

8. The dispenser according to claim 2 wherein the lid part carries a day ring concentric with the lid part and which is rotated relatively to the lid part.

9. The dispenser according to claim 8, wherein a pointer pointing at the day ring is secured to the dispensing part to be rotated with it relatively to the body.

10. The dispenser according to claim 8 wherein the lid part carries a hinged lid which may be closed to cover the day ring and the opening of a cup formed by the cylindric wall and the bottom plate of the dispensing part.

11. The dispenser according to claim 2 wherein the chutes are conical being widest at the top.

12. The dispenser according to claim 1 wherein a removable locking device at the inner side of the cylindric wall covers the slot.

* * * * *